United States Patent
Yoshida (10) Patent No.: US 7,193,351 B2
(45) Date of Patent: Mar. 20, 2007

(54) DRIVING DEVICE AND DRIVING METHOD

(75) Inventor: Ryuichi Yoshida, Sakai (JP)

(73) Assignee: Konica Minolta Opto, Inc., Hachioji (JP)

( * ) Notice: Subject to any disclaimer, the term of this patent is extended or adjusted under 35 U.S.C. 154(b) by 0 days.

(21) Appl. No.: 11/284,056

(22) Filed: Nov. 21, 2005

(65) Prior Publication Data

US 2006/0113865 A1   Jun. 1, 2006

(30) Foreign Application Priority Data

Dec. 1, 2004   (JP)   ............... 2004-348134

(51) Int. Cl.
*H01L 41/08*   (2006.01)
(52) U.S. Cl. ................ 310/317; 310/323.02
(58) Field of Classification Search .......... 310/316.01, 310/316.02, 317, 323.02
See application file for complete search history.

(56) References Cited

U.S. PATENT DOCUMENTS

| | | | |
|---|---|---|---|
| 5,589,723 A * | 12/1996 | Yoshida et al. ............. | 310/328 |
| 5,917,267 A | 6/1999 | Miyazawa et al. ........... | 310/317 |
| 6,016,231 A | 1/2000 | Kanbara et al. ............. | 359/824 |
| 6,232,697 B1 * | 5/2001 | Mizumoto .................. | 310/317 |
| 6,249,093 B1 * | 6/2001 | Takahata et al. ............ | 318/129 |
| 6,320,298 B1 * | 11/2001 | Kawabe ...................... | 310/317 |
| 6,483,226 B1 * | 11/2002 | Okada ........................ | 310/328 |
| 6,512,321 B2 * | 1/2003 | Yoshida et al. ........ | 310/316.01 |
| 6,703,762 B1 * | 3/2004 | Okada ........................ | 310/317 |
| 6,717,329 B2 * | 4/2004 | Yoshida et al. ........ | 310/316.02 |
| 6,727,635 B2 * | 4/2004 | Okamoto et al. ....... | 310/316.01 |
| 6,876,126 B2 * | 4/2005 | Okada ........................ | 310/317 |

* cited by examiner

*Primary Examiner*—Mark Budd
(74) *Attorney, Agent, or Firm*—Sidley Austin LLP (57) ABSTRACT

A rod is sawtooth-like vibrated by cyclically applying, to a piezoelectric element, voltage values which are stepwise and sequentially increased or decreased, so that a moving unit is driven along the rod in one direction or the opposite direction. The sequentially increased or decreased voltage values are generated by controlling of turning "on" or "off" of a plurality of switching elements, which are disposed in a circuit arrangement, wherein the piezoelectric element, and 1st and 2nd capacitors are arranged between a positive power supply and a negative power supply. When the 1st capacitor has a parallel positional relationship with the piezoelectric element and the 2nd capacitor serially connected, a switching element serially connected to the 1st capacitor is opened. When the 2nd capacitor has a parallel positional relationship with the piezoelectric element and the 1st capacitor serially connected, a switching element serially connected to the 2nd capacitor is opened.

7 Claims, 11 Drawing Sheets

WAVEFORM GENERATOR     POWER AMPLIFIER     PIEZOELECTRIC ELEMENT

Fig.4B PRIOR ART

FORWARDING WAVEFORM

Fig.4C PRIOR ART

BACKWARDING WAVEFORM

Fig. 10A (ONLY "Q1" IS TURNED ON)

Fig. 10B (ONLY "Q2" IS TURNED ON)

DRIVING DEVICE AND DRIVING METHOD

This application is based on the application No. 348134/2004 filed in Japan, the contents of which are hereby incorporated by reference.

BACKGROUND OF THE INVENTION

1. Field of the Invention

The present invention relates to a driving device, and particularly to a driving device and a driving method, wherein an elelctromechanical transducer such as a piezoelectric element is utilized. The driving device of the present invention is suitably used in the lens-driving mechanism of a camera or the driving mechanism of a precision stage.

2. Description of the Related Art

U.S. Pat. No. 6,016,231 discloses one of the conventional driving devices. The driving device comprises electromechanical transducers such as piezoelectric elements, which change in length (expand or contract) under the application of voltage. The driving device is shown in the exploded perspective view of FIG. 1A and the assembled perspective view of FIG. 1B.

Figures 1A, 1B:
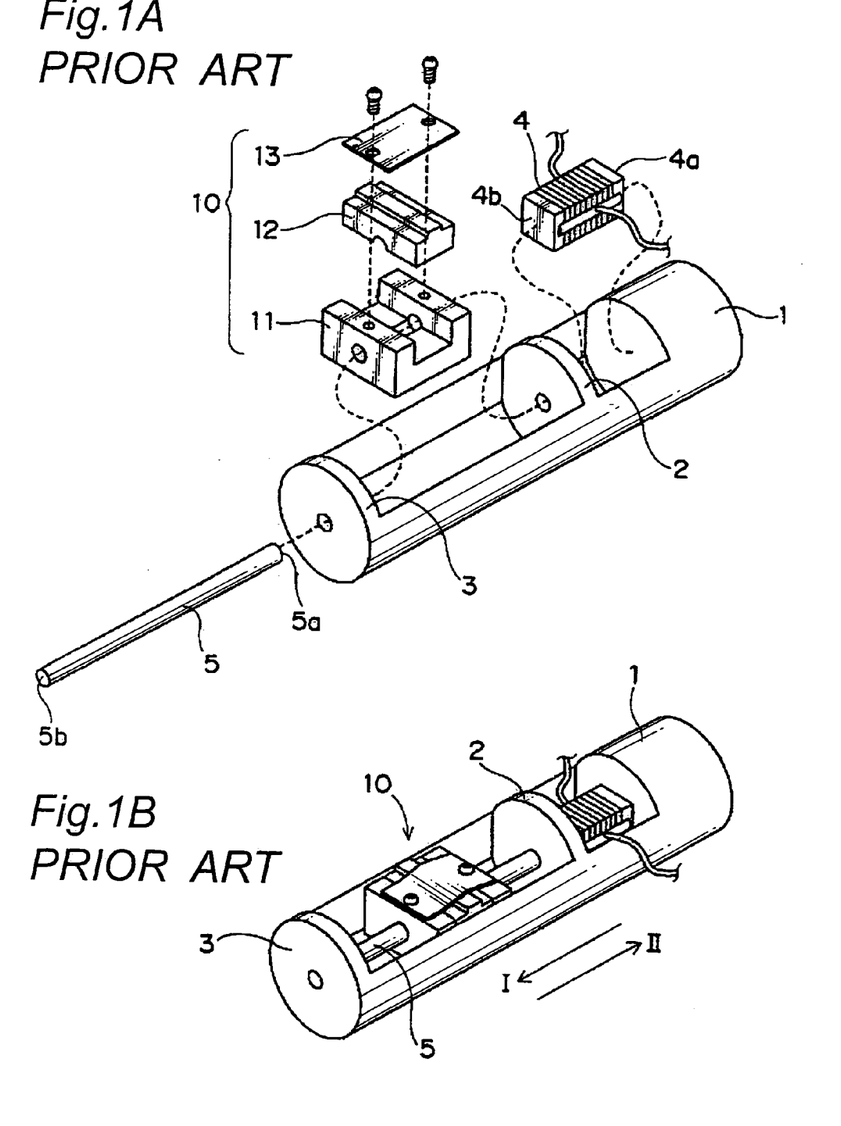
FIG. 1A shows an exploded perspective view of a conventional driving device.
FIG. 1B shows the assembled perspective view of the driving device shown in FIG. 1A.

This driving device causes the moving unit 10 to move relative to the base 1, and it is used, for example, as a lens-driving unit for a camera. That is, it becomes possible to move a lens together with the moving unit 10 by coupling the moving unit 10 to the barrel of the lens.

The piezoelectric element 4 which comprises a plurality of piezoelectric plates laminated on one another is fixed at its one end 4a to the base 1 and is fixed at its other end 4b to the 1st end 5a of the rod 5, in the expanding or contracting direction. The rod 5 is slidably supported by the support portions 2 and 3 formed integrally with the base 1.

The moving unit 10 holds the rod 5 between the body 11 thereof and the cap 12 and grasps the rod 5 under an urging force from the spring 13 in approaching direction of the body 11 and the cap 12. In such the manner, the moving unit 10 is frictionally coupled on the surface of the rod 5.

Figure 2:
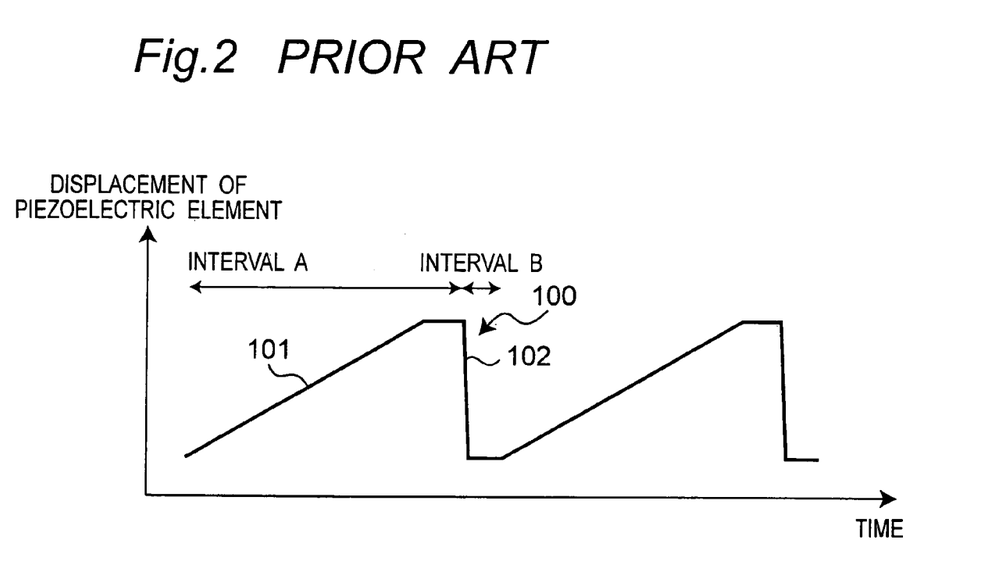
FIG. 2 shows a graph illustrating the driving principle of the driving device shown in FIGS. 1A and 1B.

The piezoelectric element 4 is connected to a voltage control circuit (a driving pulse generator), which is not shown. When a predetermined driving voltage having a sawtooth-like waveform is applied to the piezoelectric element 4, the piezoelectric element 4 vibrates, showing substantially the same sawtooth-like displacement (FIG. 2). With this vibration of the piezoelectric element 4, the rod 5 also vibrates showing sawtooth-like amplitudes, in the longitudinal direction thereof. The graph of FIG. 2 is one showing the vibration amplitudes of the rod 5, as well as the vibration amplitudes of the piezoelectric element 4.

This is described in more detail. The piezoelectric element 4 relatively slowly expands at the gentle upward inclination 101 of the 1st waveform 100 during the time interval "A", where the rod 5 slowly moves in the arrowhead direction "I" in FIG. 1B. Next, the piezoelectric element 4 quickly contracts to the initial length thereof (indicated by the downward inclination 102 of the waveform) during the time interval "B", where the rod 5 quickly moves in the arrowhead direction "II" in FIG. 1B.

The same motions are repeated, so that the rod 5 vibrates while repeating the slow motion in the direction "I" and the quick motion in the direction "II". In this way, the rod 5 vibrates drawing the sawtooth-like waveforms comprising gentle and acute inclinations, as shown in FIG. 2.

Figure 3:
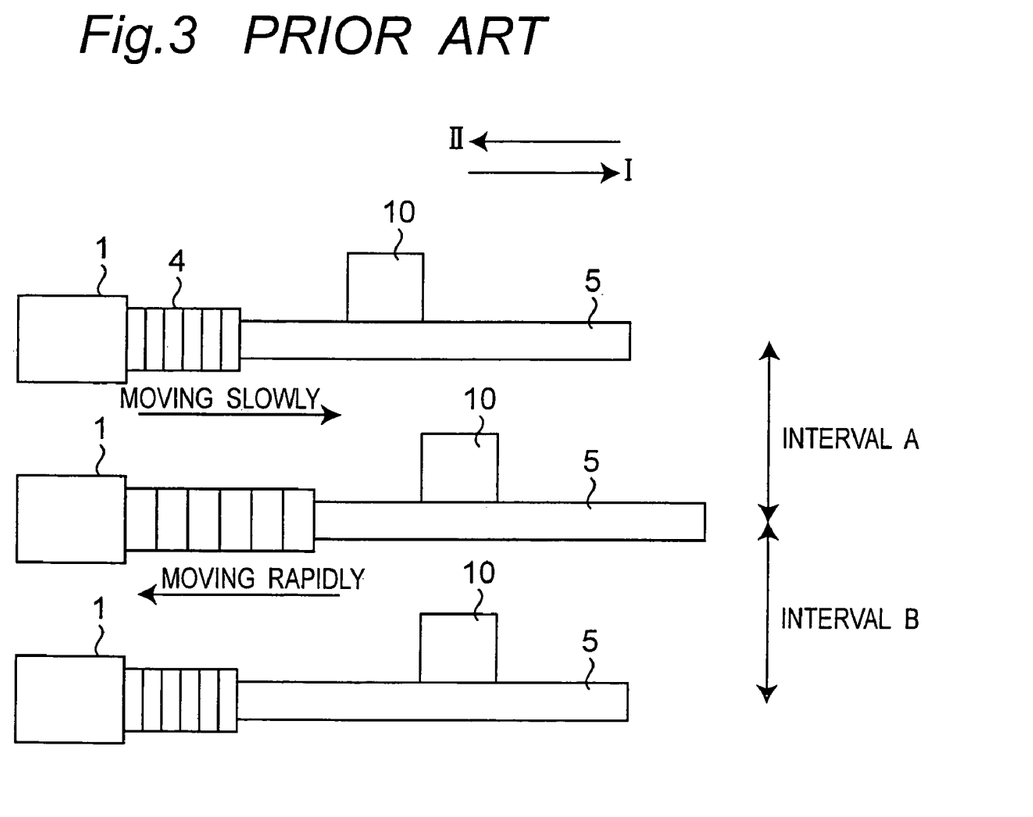
FIG. 3 shows a diagram illustrating the driving principle of the driving device shown in FIGS. 1A and 1B.

Note that the force (the frictional coupling force of the moving unit 10 to the rod 5) from the spring 13 of the moving unit 10 is adjusted, such that the moving unit 10 moves together with the rod 5, when the rod 5 slowly moves, and such that the moving unit 10 remains there due to its inertia (or moves less than the rod 5), when the rod 5 quickly moves, as shown in FIG. 3. Accordingly, the moving unit 10 moves relative to the base 1 in the direction "I", during the rod 5 is vibrating.

When the moving unit 10 is moved in the direction "II" in FIG. 1B, the vibration waveforms of the piezoelectric element 4 and the rod 5 shown in FIG. 2 are inverted, such that a waveform comprises an acute upward inclination and a gentle downward inclination. The moving principle of the moving unit 10 in this case is the same as that described above.

As mentioned above, it is needed to apply the driving voltage having the sawtooth-like waveform to the piezoelectric element. U.S. Pat. No. 5,917,267 discloses some methods for generating such the driving voltage, as described below with reference to FIGS. 4A to 5B.

<<Using a Waveform Generator and an Amplifier (FIGS. 4A to 4C)>>

Figure 4A:
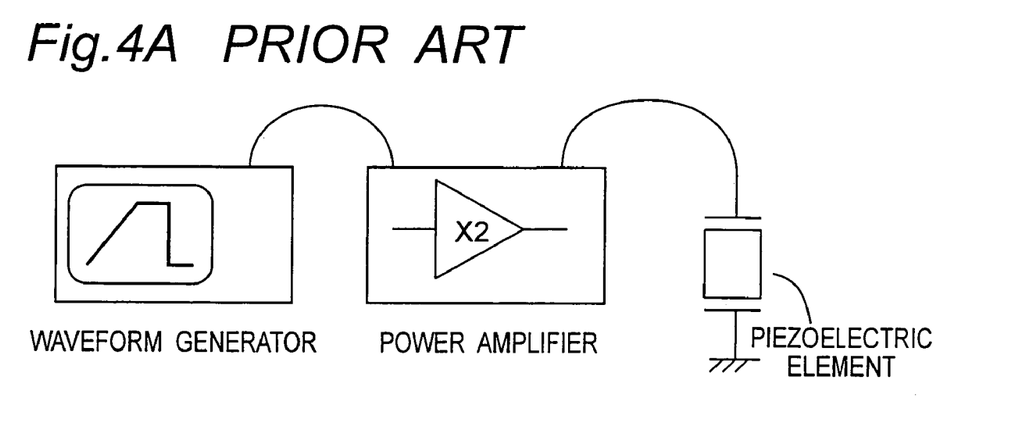
FIGS. 4A, 4B and 4C respectively shows a diagram illustrating a conventional method for generating a driving voltage having a sawtooth-like waveform.

A sawtooth-like waveform of 8 bits and 0–5 V is generated through the DA conversion by a waveform generator, and is then amplified to 0–10 V by using a power amplifier (FIG. 4A). Thus, a sawtooth-like waveform of 0–10 V for driving is obtained.

Figure 4B:
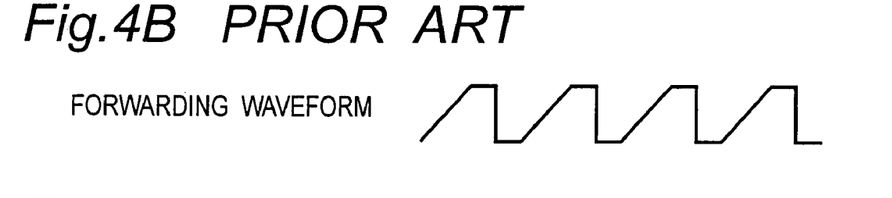
Figure 4C:
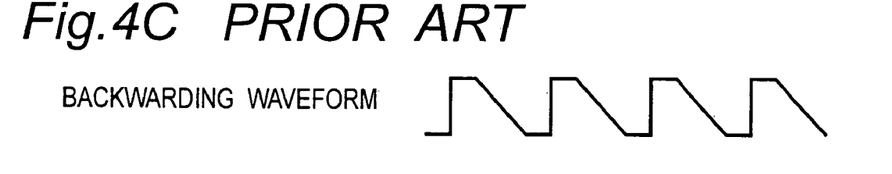

FIG. 4B shows a driving voltage waveform for driving the moving unit 10 in the direction "I" in FIG. 3, and FIG. 4C shows a driving voltage waveform for driving the moving unit 10 in the opposite direction "II" in FIG. 3.

<<Using a Constant Current Circuit and a Switch Circuit (FIGS. 5A and 5B)>>

Figure 5A:
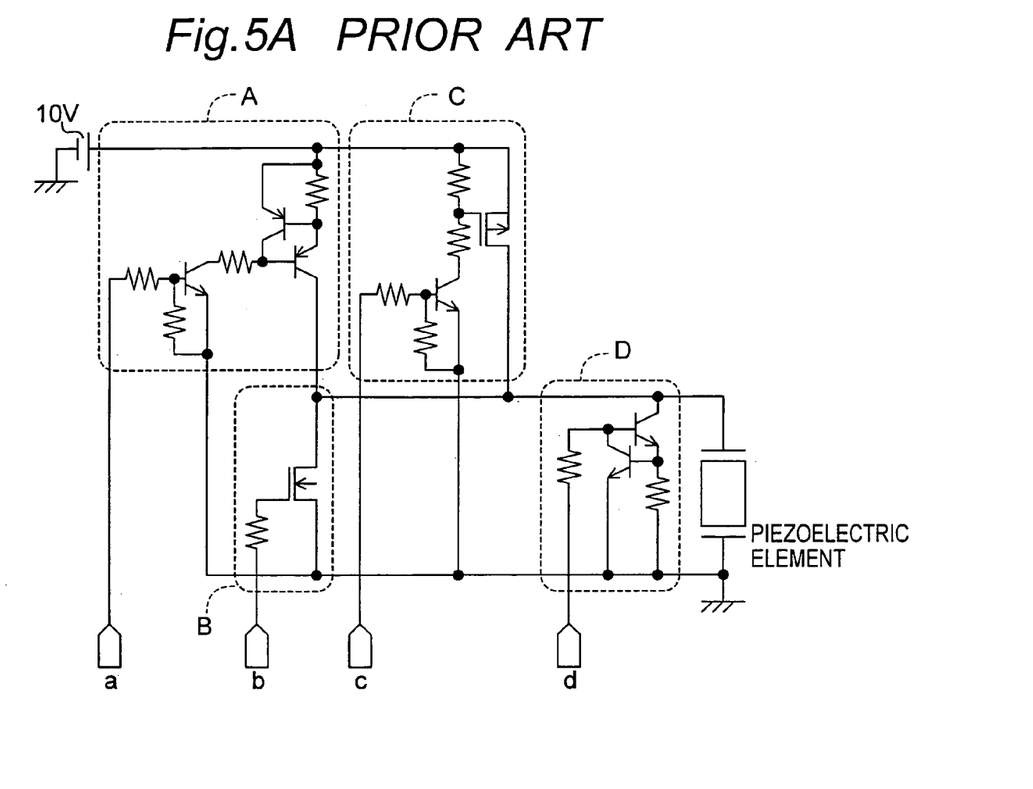
FIGS. 5A and 5B respectively shows a circuit and a diagram illustrating a conventional method of generating a driving voltage having a sawtooth-like waveform.
Figure 5B:
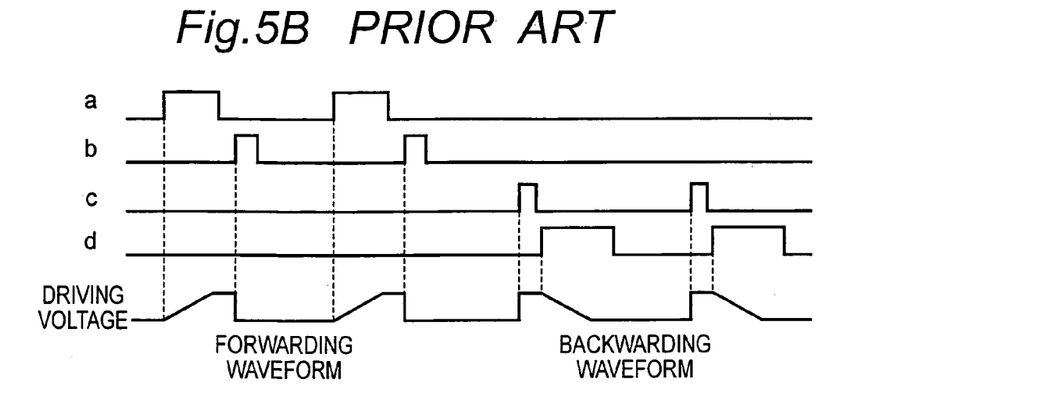

In the digital circuit shown in FIG. 5A, the notations "A" and "D" represent constant current circuits, and the notations "B" and "C" represent switch circuits. The signals shown in FIG. 5B are respectively fed to the terminals "a" to "d" of this digital circuit to thereby alternately operate the constant current circuits "A", "D" and the switch circuits "B", "C" to generate sawtooth-like waveforms for use in 0–10 V driving.

As described above, the conventional driving devices have complicated structures and thus cost higher, since the waveform generators and the amplifiers, or the constant current circuits and the switching means, are needed to obtain the driving voltages having sawtooth-like waveforms.

Therefore, an object of the present invention is to provide a driving device including an electromechanical transducer, which is provided with a driving pulse generator which generates a driving voltage having a sawtooth-like waveform with a simple circuit arrangement and which consumes less power.

It is another object of the present invention to provide a driving method for the above-mentioned driving device.

SUMMERY OF THE INVENTION

In order to achieve the objects of the present invention, according to a first aspect of the present invention, there is provided a driving device comprising:

an electromechanical transducer, which expands or contracts under voltage from a driving pulse generator;

a rod, one end of which is fixed to one end of the electromechanical transducer, in expanding or contracting direction; and a moving unit, which is frictionally coupled to the rod, and which is driven along the rod when the rod vibrates with expanding and contracting of the electromechanical transducer;

wherein the driving pulse generator cyclically applies 4 voltage values, which are stepwise and sequentially increased, to the electromechanical transducer, such that sawtooth-like vibration generated thereby on the rod drives the moving unit in one direction along the rod, and cyclically applies 4 voltage values, which are stepwise and sequentially decreased, to the electromechanical transducer, such that sawtooth-like vibration generated thereby on the rod drives the moving unit in opposite direction along the rod;

the 4 voltage values which are stepwise and sequentially increased and the 4 voltage values which are stepwise and sequentially decreased are generated by controlling of turning "on" or "off" of a plurality of switching elements, which are disposed in a circuit arrangement, wherein the electromechanical transducer, and 1st and 2nd capacitors are disposed between a positive power supply and a negative power supply;

the turning "on" or "off" of the switching elements are controlled, such that: when the moving unit is driven in the one direction by one voltage value of the 4 voltage values which are stepwise and sequentially increased, the 1st capacitor is to be a parallel positional relationship with the electromechanical transducer and the 2nd capacitor which are serially connected, relative to the current flow, and such that: when the moving unit is driven in the opposite direction by one voltage value of the 4 voltage values which are stepwise and sequentially decreased, the 2nd capacitor is to be a parallel positional relationship with the electromechanical transducer and the 1st capacitor which are serially connected, relative to the current flow;

another switching element is arranged in serial to the 1st capacitor, which is opened when the 1st capacitor has a parallel positional relationship with the serially connected electromechanical transducer and 2nd capacitor; and still another switching element is arranged in serial to the 2nd capacitor, which is opened when the 2nd capacitor C2 has a parallel positional relationship with the serially connected electromechanical transducer and 1st capacitor.

Note that a barrel which holds a lens can be connected to the moving unit of the driving devise. Then, a lens driving unit for a camera is provided.

The second aspect of the present invention provides a method for driving a moving unit which is provided in a driving device:

the driving device comprising:

an electromechanical transducer, which expands or contracts under voltage;

a rod, one end of which is fixed to one end of the electromechanical transducer, in expanding or contracting direction; and the moving unit, which is frictionally coupled to the rod, and which is driven along the rod when the rod vibrates with expanding and contracting of the electromechanical transducer;

wherein a plurality of voltage values, which are stepwise and sequentially increased, are cyclically applied to the electromechanical transducer, such that sawtooth-like vibration generated thereby on the rod drives the moving unit in one direction along the rod, and a plurality of voltage values, which are stepwise and sequentially decreased, are cyclically applied to the electromechanical transducer, such that sawtooth-like vibration generated thereby on the rod drives the moving unit in opposite direction along the rod;

the method comprising:

a step of generating the plurality of voltage values which are stepwise and sequentially increased and the plurality of voltage values which are stepwise and sequentially decreased, by controlling of turning "on" or "off" of a plurality of switching elements, which are disposed in a circuit arrangement, wherein the electromechanical transducer, and 1st and 2nd capacitors are disposed between a positive power supply and a negative power supply;

a step of controlling, of the turning "on" or "off" of the switching elements, such that: when the moving unit is driven in the one direction by one voltage value of the plurality of voltage values which are stepwise and sequentially increased, the 1st capacitor is to be a parallel positional relationship with the electromechanical transducer and the 2nd capacitor which are serially connected, relative to the current flow, and such that: when the moving unit is driven in the opposite direction by one voltage value of the plurality of voltage values which are stepwise and sequentially decreased, the 2nd capacitor is to be a parallel positional relationship with the electromechanical transducer and the 1st capacitor which are serially connected, relative to the current flow;

a step of opening a switching element which is arranged in serial to the 1st capacitor, when the 1st capacitor has a parallel positional relationship with the serially connected electromechanical transducer and 2nd capacitor; and a step of opening a switching element which is arranged in serial to the 2nd capacitor, when the 2nd capacitor C2 has a parallel positional relationship with the serially connected electromechanical transducer and 1st capacitor.

In the driving device and the driving method of the present invention, the driving pulse generator for applying the driving voltage to the electromechanical transducer do sequentially change the magnitudes of the simple and constant voltage values to realize a stepwise waveform, and then the driving voltage of the stepwise waveform is applied to the electromechanical transducer. Therefore, the control of the driving device is simple and the circuit arrangement can be simplified, and thus, the cost for the device can be reduced.

In addition, a switching element, which opens when the 1st capacitor has a parallel positional relationship with the serially connected electromechanical transducer and 2nd capacitor, is connected in series to the 1st capacitor. Accordingly, the charging of the 1st capacitor unnecessary for driving the moving unit is not carried out, and thus, the power consumption can be saved.

Likewise, a switching element, which opens when the 2nd capacitor has a parallel positional relationship with the serially connected electromechanical transducer and 1st capacitor, is connected in series to the 2nd capacitor. Accordingly, the charging of the 2nd capacitor unnecessary for driving the moving unit is not carried out, and thus, the power consumption can be saved.

BRIEF DESCRIPTION OF THE DRAWINGS

These and other objects and features of the present invention will become apparent from the following description taken in conjunction with the preferred embodiments thereof with reference to the accompanying drawings.

DETAILED DESCRIPTION OF THE PREFERRED EMBODIMENT

Hereinafter, the embodiments of the present invention will be described in more detail with reference to the accompanying drawings.

<<Circuit Arrangement (FIGS. 6 and 7)>>

Figure 6:
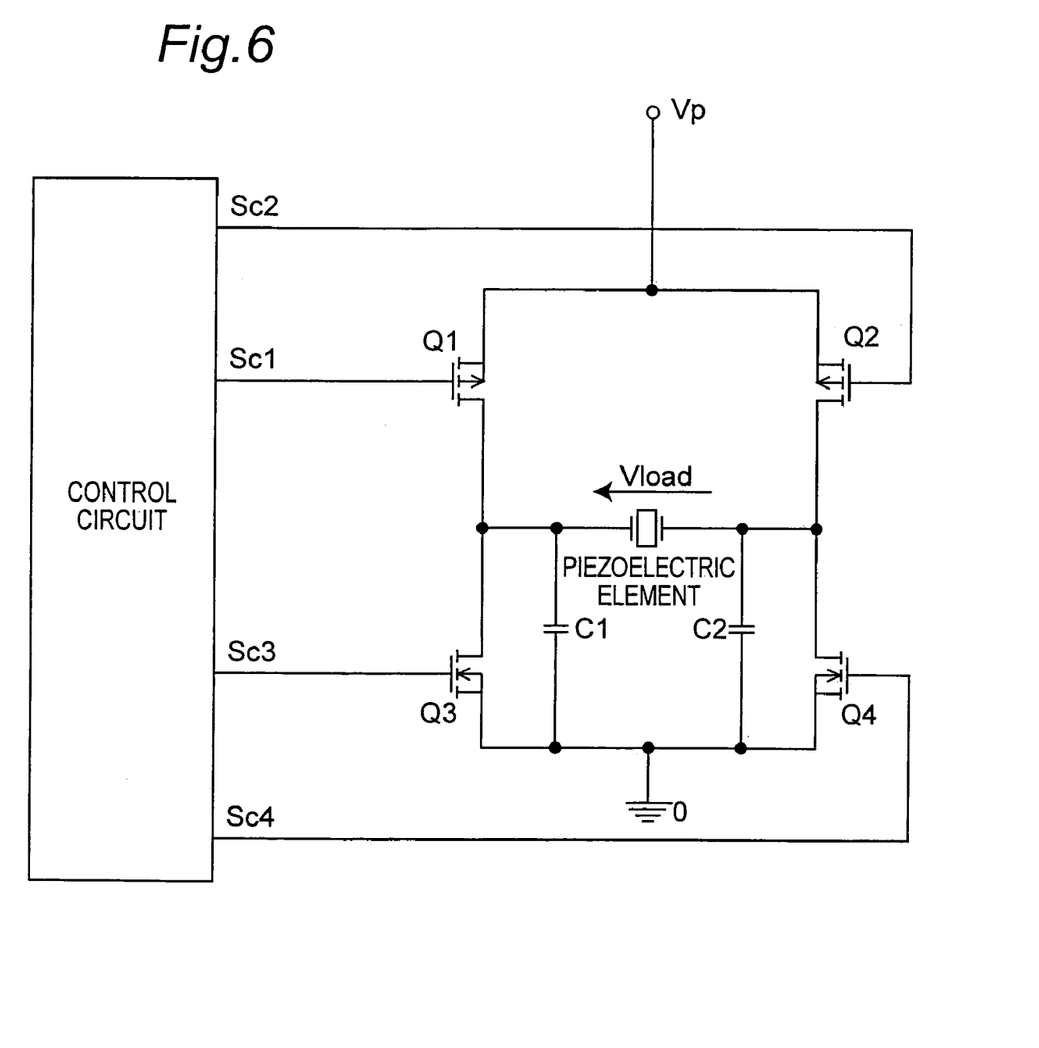
FIG. 6 shows a circuit diagram illustrating an embodiment of driving circuits according to the present invention.

FIG. 6 shows a circuit arrangement (or a driving pulse generator) for applying a voltage to a piezoelectric element in a driving device of the present invention. The mechanical constitution of the driving device of the present invention is the same as that of the conventional driving device shown in FIGS. 1A and 1B, but the circuit arrangement of the driving circuit is different from the conventional.

That is, the driving circuit shown in FIG. 6 is employed to drive the piezoelectric element 4 shown in FIGS. 1A and 1B.

As shown in FIG. 6, a circuit arranged in an "H" bridge comprises 4 switches Q1 to Q4, 2 capacitors C1 and C2, and a piezoelectric element. The switches Q1 and Q2 are composed of P-channel type MOSFETs, respectively, and the switches Q3 and Q4 are composed of N-channel type MOSFETs, respectively.

The source of the switch Q1 is connected to the terminal Vp, and the gate thereof is connected to the terminal Sc1 of the control circuit.

The source of the switch Q2 is connected to the terminal Vp, and the gate thereof is connected to the terminal Sc2 of the control circuit.

The drain of the switch Q3 is connected to the drain of the switch Q1, and the source thereof is grounded. The gate of the switch Q3 is connected to the terminal Sc3 of the control circuit.

The drain of the switch Q4 is connected to the drain of the switch Q2, and the source thereof is grounded. The gate of the switch Q4 is connected to the terminal Sc4 of the control circuit.

One end of the piezoelectric element is connected between the drains of the switches Q1 and Q3, and the other end is connected between the drains of the switches Q2 and Q4.

As shown in FIG. 6, the capacitors C1 and C2 are arranged in parallel to the switches Q3 and Q4, respectively. Each of the capacitors C1 and C2 has a capacity equal to that of the piezoelectric element.

Figure 7:
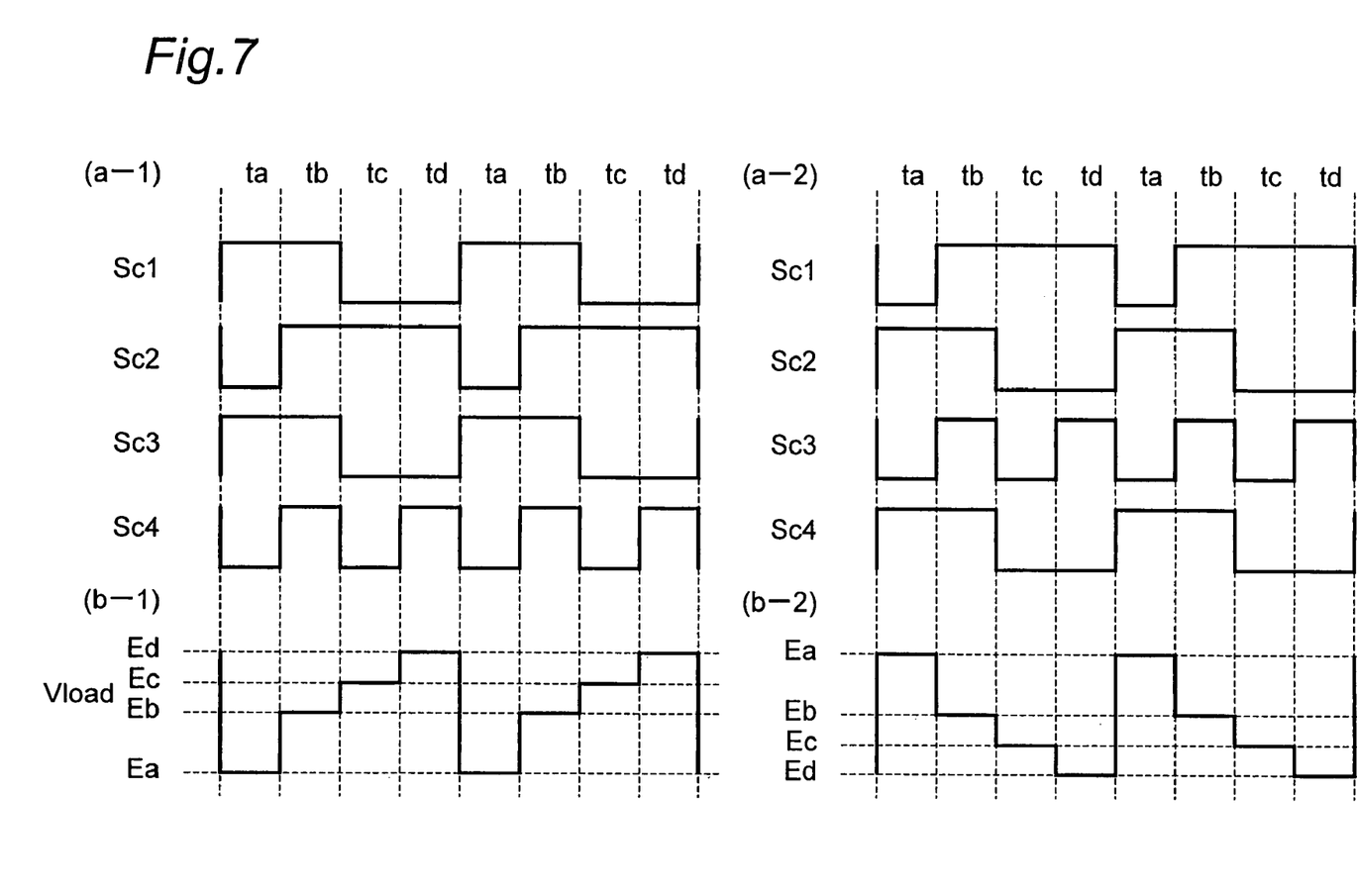
FIG. 7 shows diagrams illustrating control signals fed to the driving circuit shown in FIG. 6 and a voltage applied to a piezoelectric element.

In the driving circuit shown in FIG. 6, voltages to the gates of the switches Q1 to Q4 are controlled as shown in FIG. 7($a$-1), under signals from the control circuit. Then, the driving voltage (Ea, Eb, Ec and Ed) of a stepwise waveform as shown in FIG. 7($b$-1) is applied to the piezoelectric element. As is understood from FIGS. 7($a$-1) and 7($b$-1), the notations "ta" to "td" indicate the time intervals over which the gate voltages are applied, respectively. The time intervals "ta" to "td" make one cycle.

During the time interval "ta", the switches Q2 and Q3 are turned on, while the switches Q1 and Q4 are turned off. On the other hand, during the time interval "td", the switches Q1 and Q4 are turned on, while the switches Q2 and Q3 are turned off. Accordingly, during the time intervals "ta" and "td", the voltages applied to the piezoelectric element are equal in absolute value, but the signs (plus or minus) of the voltages are reversed. When a voltage of 3 V is applied to the terminal Vp, the driving voltage Ed applied to the piezoelectric element is +3 V (Ed =+3 V), provided that the driving voltage Ea applied to the piezoelectric element is −3 V (Ea=−3 V).

During the time interval "tb", both of the switches Q1 and Q2 are turned off, and therefore, the driving voltage Eb is zero (Eb=0). During the time interval "tc", only the switch Q1 is turned on. Since the capacities of the piezoelectric element and the two capacitors C1 and C2 are equal to one another, the driving voltage Ec is +1.5 V (Ec=0.5 Ed=+1.5 V).

By repeating the cycle of "ta" to "td", the driving voltage having a stepwise waveform as shown in FIG. 7($b$-1) can be cyclically applied to the piezoelectric element. By doing so, the moving unit 10 is driven in the direction "I" in FIG. 1B.

FIGS. 7($a$-2) and 7($b$-2) show voltages to the respective gates and a driving voltage corresponding to these gate voltages, in the case that the moving unit 10 is driven in the opposite direction (the direction "II" in FIG. 1B).

<<Waveform of Driving Voltage (FIGS. 8 and 9)>>

Figure 8:
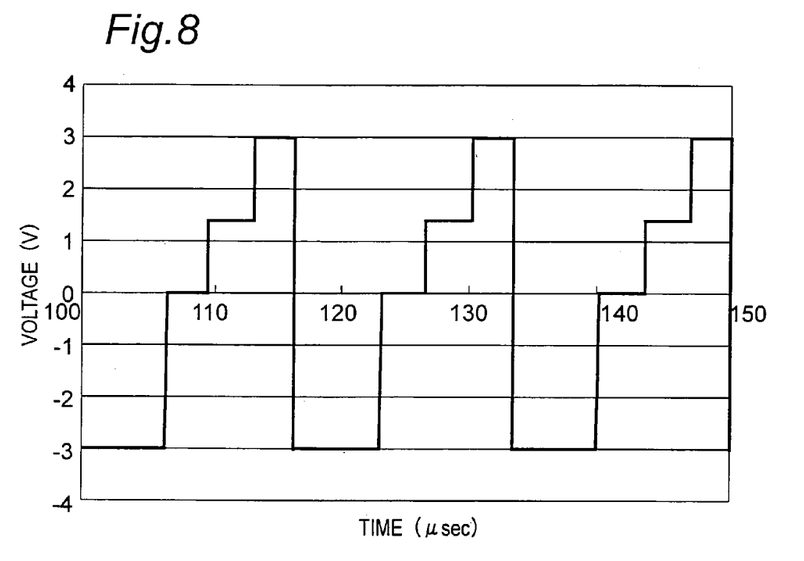
FIG. 8 shows a graph illustrating an example of the waveforms of driving voltages applied to the piezoelectric element from the driving circuit shown in FIG. 6.

FIG. 8 shows a graph of the driving voltage, wherein the voltage-applying time intervals "ta", "tb", "tc", and "td" in FIG. 7($a$-1) are respectively set, such that "ta"=1.0T, and "tb"="tc"="td"=0.5T.

Since the resonance frequency 1/T ("T" represents a cycle) of the mechanical system (the electromechanical transducer and the rod) shown in FIG. 1B is 150 kHz, the cycle "T" is 6.66 μsec (T=1/150,000=6.66 μsec). That is, time interval "ta" is 6.66 μsec ("ta"=1.0T=6.66 μsec), and the time intervals "tb", "tc" and "td" are 3.33 μsec respectively ("tb"="tc"="td"=0.5T=3.33 μsec).

Figure 9:
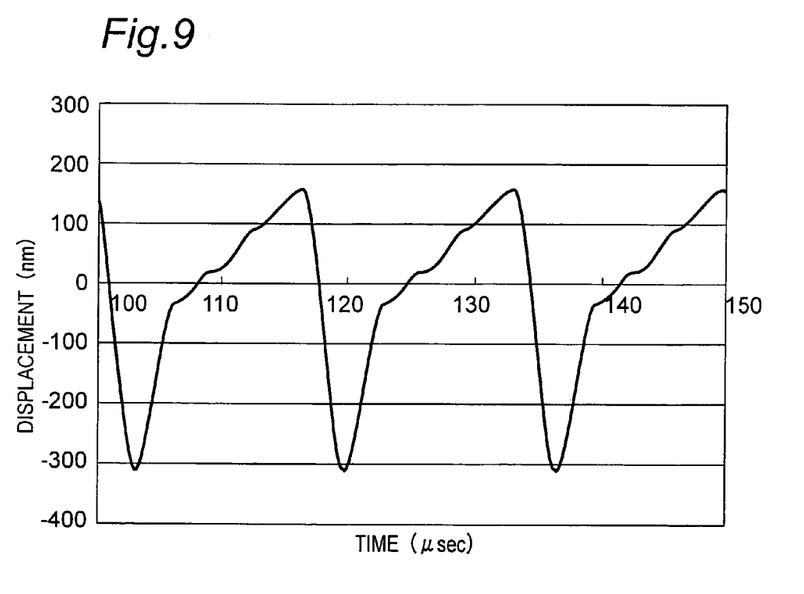
FIG. 9 shows a graph illustrating the vibration of the rod when the driving voltage shown in FIG. 8 is applied.

FIG. 9 shows the displacement of the rod when the driving voltage shown in FIG. 8 is applied to the piezoelectric element. It is found that the sawtooth-like vibration of the rod substantially corresponds to the stepwise waveform of the driving voltage shown in FIG. 8.

As is understood from the foregoing description, in the present invention, a simple voltage of constant value is applied during each of the time intervals. Only by sequentially changing the values of such the constant voltage, the sawtooth-like vibration of the rod can be realized.

<<Improvement for saving the Power Consumption>>

On the basis of the above mentioned circuit arrangement, another circuit arrangement is next described, wherein power consumption can be reduced while providing similar effects as above.

As described above, in the circuit arrangement shown in FIG. 6, in order to achieve that the driving voltage Ec is equal to 0.5 Ed (Ec=0.5 Ed) during the time interval "tc" (FIG. 7), the followings are employed: that is, the capacities of the capacitors C1 and C2 are set equal to the capacity of the piezoelectric element, and the driving voltage is controlled, so that only the switch Q1 can be turned on during the time interval "tc" (in the case where the moving unit 10 is driven in the direction "I" in FIG. 1B), or so that only the switch Q2 can be turned on during the time interval "tc" (in the case where the moving unit 10 is driven in the direction "II" in FIG. 1B).

Figure 10A:
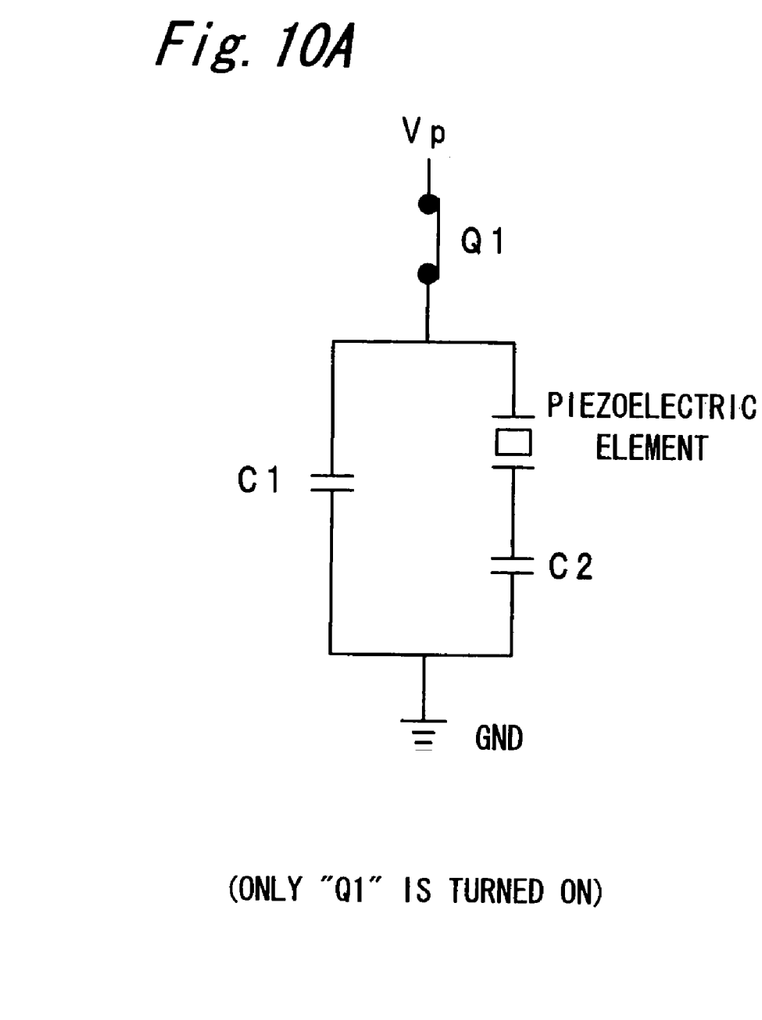
FIGS. 10A and 10B respectively shows an equivalent circuit diagram, each illustrating the condition of the driving circuit in FIG. 6 during the time interval "tc".
Figure 10B:
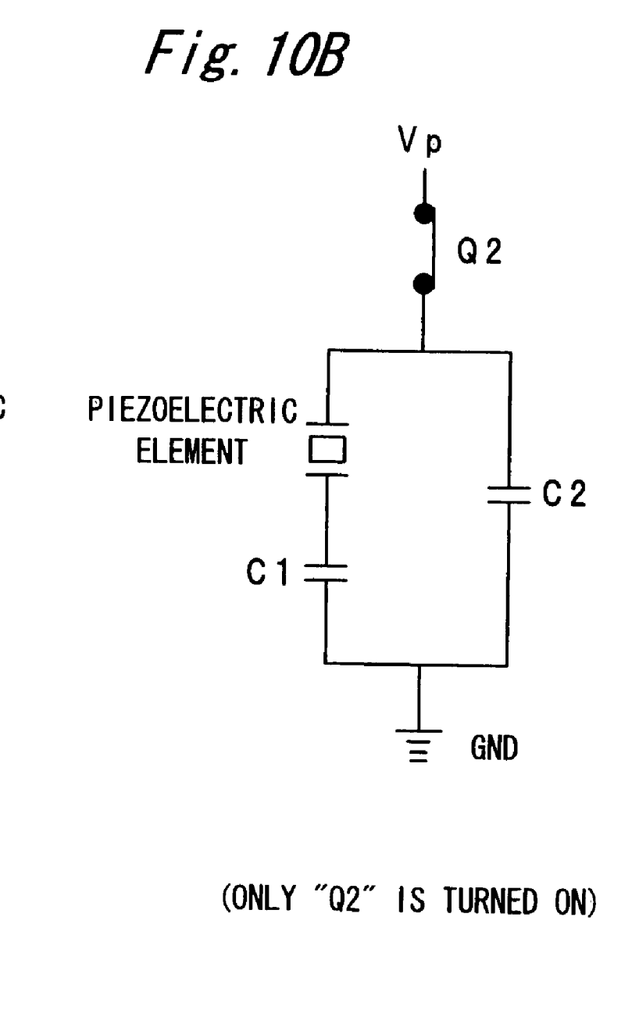

Such conditions during the time interval "tc" can be represented by equivalent circuits shown in FIGS. 10A and 10B. FIG. 10A shows an equivalent circuit for driving the moving unit 10 in the direction "I" in FIG. 1B during the time interval "tc", and FIG. 10B shows an equivalent circuit for driving the moving unit 10 in the direction "II" in FIG. 1B during the time interval "tc".

In the equivalent circuit shown in FIG. 10A, the capacitor C1 is also to be charged, and in the equivalent circuit shown in FIG. 10B, the capacitor C2 is also to be charged. These charging are not needed to drive the moving unit 10, and therefore, omitting such the useless charging would save the power consumption.

Figure 11:
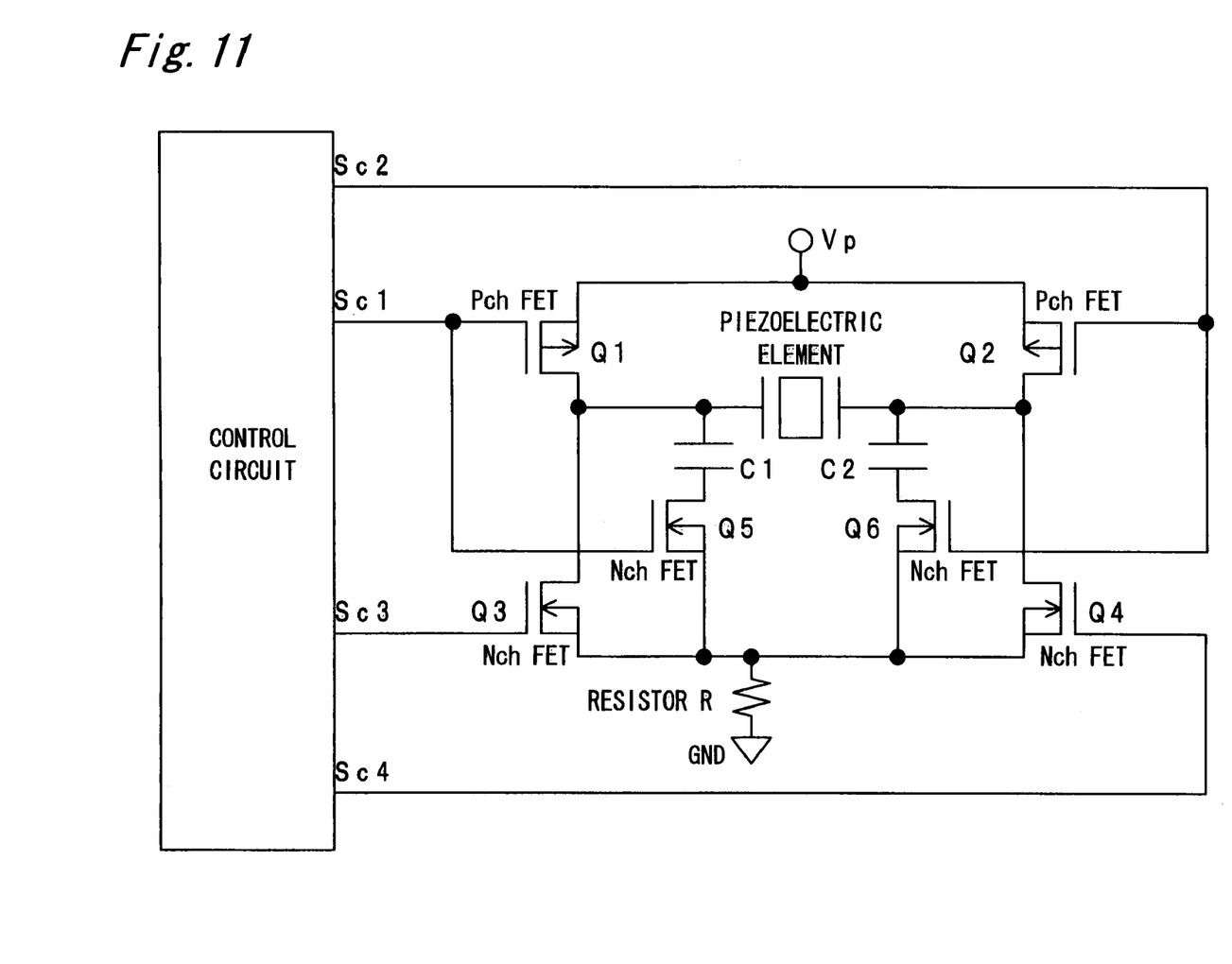
FIG. 11 shows a circuit diagram illustrating an embodiment of improved driving circuits for saving the power consumption.

FIG. 11 shows one of such the improved driving circuits. The substantial difference in the driving circuit shown in FIG. 11 against the driving circuit shown in FIG. 6 is that the additional switches Q5 and Q6 are serially connected to the capacitors C1 and C2, respectively.

Since the gate of the switch Q5 is connected to the terminal Sc1 of the control circuit, the switch Q5 receives the same driving voltage as that to the switch Q1. However, the switch Q1 is a P channel type MOSFET while the switch Q5 is an N channel type MOSFET, and therefore, the timing for turning "on" or "off" is reversed in switches Q1 and Q5.

Since the gate of the switch Q6 is connected to the terminal Sc2 of the control circuit, the switch Q6 receives the same driving voltage as that to the switch Q2. However, the switch Q2 is a P channel type MOSFET while the switch Q6 is an N channel type MOSFET, and therefore, the timing for turning "on" or "off" is reversed in switches Q2 and Q6.

Figure 12A:
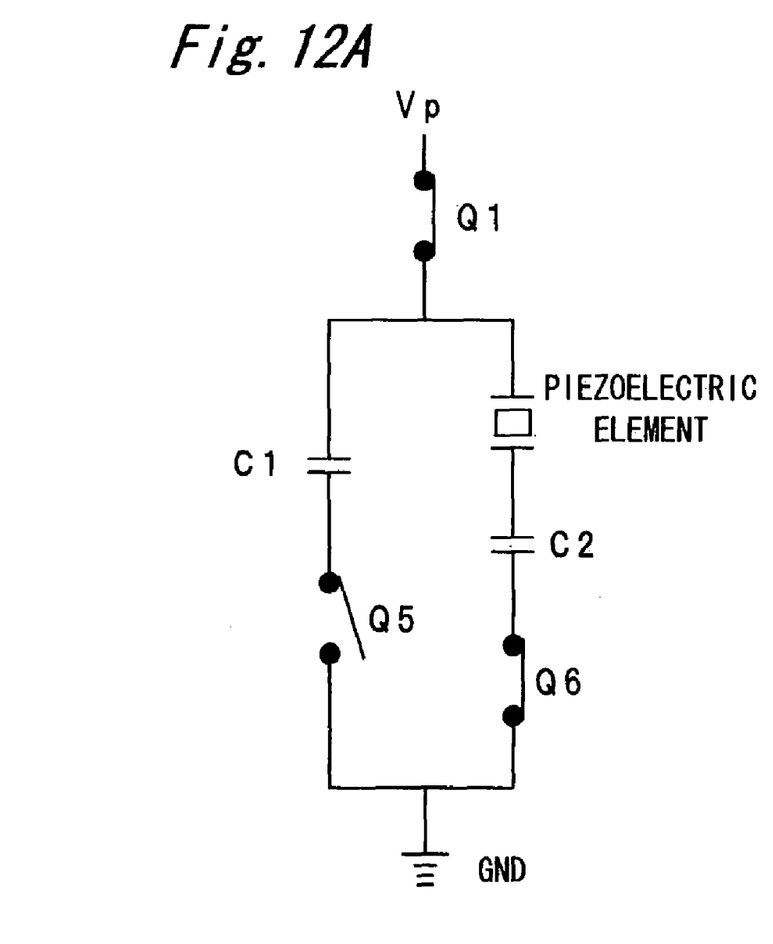
FIGS. 12A and 12B respectively shows an equivalent circuit diagram, each illustrating the condition of the circuit in FIG. 11 during the time interval "tc".
Figure 12B:
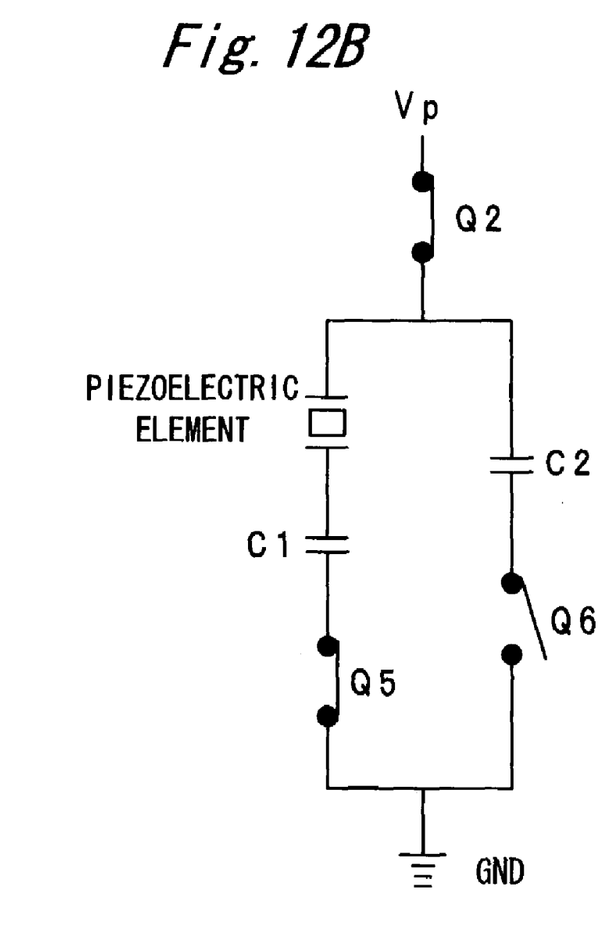

As a result of the addition of the switches Q5 and Q6, the equivalent circuit shown in FIG. 10A can be revised to an equivalent circuit shown in FIG. 12A, and the equivalent circuit shown in FIG. 10B can be revised to an equivalent circuit shown in FIG. 12B.

As described above, the timing for turning "on" or "off" is reversed in the switches Q1 and Q5, and the timing for turning "on" or "off" is reversed in the switches Q2 and Q6. Therefore, in the equivalent circuit shown in FIG. 12A, the switches Q1 and Q6 are closed, and the switch Q5 is opened. That is, the route from the terminal Vp to the GND via the capacitor C1 is opened, so that a current passes through only the piezoelectric element and the capacitor C2.

Likewise, in the equivalent circuit shown in FIG. 12B, the switches Q2 and Q5 are closed, and the switch Q6 is opened. That is, the route from the terminal Vp to the GND via the capacitor C2 is opened, so that a current passes through only the piezoelectric element and the capacitor C1.

In the case of the circuit shown in FIG. 12A (during the time interval "tc" wherein the moving unit 10 is driven in the direction "I" in FIG. 1B), unnecessary charging of the capacitor C1 is not carried out. Likewise, in the case of the circuit shown in FIG. 12B (during the time interval "tc" wherein the moving unit 10 is driven in the direction "II" in FIG. 1B), unnecessary charging of the capacitor C2 is not carried out. Therefore, the power consumption can be saved, or reduced.

For example, when the moving unit 10 is driven under the conditions that the capacities of the piezoelectric element and the capacitors C1, C2 are 50 nF respectively, that the driving frequency is 100 kHz, and that the voltage to the terminal Vp of the driving circuit is 3V (Vp=3V), the power consumption of the driving circuit shown in FIG. 6 is 180 mW, whereas the power consumption of the driving circuit shown in FIG. 11 is 90 mW under the same conditions.

In the embodiment shown in FIG. 11, in order to save the power consumption, a 5th MOSFET and a 6th MOSFET (Q5 and Q6) serially arranged to the capacitors C1 and C2 respectively are additionally provided to the basic circuit arrangement shown in FIG. 6, wherein 4 MOSFETs (Q1 to Q4), 2 capacitors C1, C2 and a piezoelectric element are arranged in an "H" bridge.

However, in the present invention, the basic circuit arrangement is not limited to that shown in FIG. 6. Other basic circuit arrangements can be employed, so long as an electromechanical transducer such as a piezoelectric element, and 1st and 2nd capacitors C1, C2 are disposed between the positive power supply (the terminal Vp in the shown embodiment) and the negative power supply (the terminal GND in the shown embodiment), and so long as voltage values which are stepwise and sequentially increased, and voltage values which are stepwise and sequentially decreased can be generated by controlling the turning "on" or "off" of a plurality of switching elements disposed in the circuit arrangement. To such the basic circuit arrangement, the present can be applied, provided that the turning "on" or "off" of the above-mentioned switching elements are controlled, such that: when the moving unit is driven in one direction by one voltage value of the stepwise and sequentially increased voltage values, the 1st capacitor is to be a parallel positional relationship with the electromechanical transducer and the 2nd capacitor which are serially connected, relative to the current flow, or such that: when the moving unit is driven in the opposite direction by one voltage value of the stepwise and sequentially decreased voltage values, the 2nd capacitor is to be a parallel positional relationship with the electromechanical transducer and the 1st capacitor which are serially connected, relative to the current flow.

In such the basic circuit arrangement, when the 1st capacitor C1 has a parallel positional relationship with the serially connected electromechanical transducer and 2nd capacitor C2, the switching element (Q5 in the shown embodiment) serially connected to the 1st capacitor C1 is opened. On the other hand, when the 2nd capacitor C2 has a parallel positional relationship with the serially connected electromechanical transducer and 1st capacitor C1, the switching element (Q6 in the shown embodiment) serially connected to the 2nd capacitor C2 is opened.

As a result, there can be prevented to charge the 1st capacitor C1 or the 2nd capacitor C2 with unnecessary electric charge for driving the moving unit 10, frictionally coupled on the rod, along the rod. Thus, power consumption can be saved.

Accordingly, bipolar transistors, IGBT (insulated gate bipolar transistors) and so on can be also employed as the switching elements, other than MOSFET. Further, it is also possible to change conveniently the number of switching elements and their locations in the circuit arrangement. Furthermore, it is possible to change the combination of P channel types and N channel types, even when 6 MOSFETs in total are arranged as shown in FIG. 11.

In the shown embodiments, the stepwise waveform is generated by 4 different voltage values. But, 3, 5 or more different voltage values can also be utilized for generating the stepwise waveform. In the view point that the proper vibration of the rod can be obtained with a simple circuit arrangement, it is preferable to utilize 4 different voltage values.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A driving device comprising:
   an electromechanical transducer, which expands or contracts under voltage from a driving pulse generator;
   a rod, one end of which is fixed to one end of the electromechanical transducer, in expanding or contracting direction; and
   a moving unit, which is frictionally coupled to the rod, and which is driven along the rod when the rod vibrates with expanding and contracting of the electromechanical transducer;
   wherein the driving pulse generator cyclically applies 4 voltage values, which are stepwise and sequentially increased, to the electromechanical transducer, such that sawtooth-like vibration generated thereby on the rod drives the moving unit in one direction along the rod, and cyclically applies 4 voltage values, which are stepwise and sequentially decreased, to the electromechanical transducer, such that sawtooth-like vibration generated thereby on the rod drives the moving unit in opposite direction along the rod;
   the 4 voltage values which are stepwise and sequentially increased and the 4 voltage values which are stepwise and sequentially decreased are generated by controlling of turning "on" or "off" of a plurality of switching elements, which are disposed in a circuit arrangement, wherein the electromechanical transducer, and 1st and 2nd capacitors are disposed between a positive power supply and a negative power supply;
   the turning "on" or "off" of the switching elements are controlled, such that: when the moving unit is driven in the one direction by one voltage value of the 4 voltage values which are stepwise and sequentially increased, the 1st capacitor is to be a parallel positional relationship with the electromechanical transducer and the 2nd capacitor which are serially connected, relative to the current flow, and such that: when the moving unit is driven in the opposite direction by one voltage value of the 4 voltage values which are stepwise and sequentially decreased, the 2nd capacitor is to be a parallel positional relationship with the electromechanical transducer and the 1st capacitor which are serially connected, relative to the current flow;
   another switching element is arranged in serial to the 1st capacitor, which is opened when the 1st capacitor has a parallel positional relationship with the serially connected electromechanical transducer and 2nd capacitor; and
   still another switching element is arranged in serial to the 2nd capacitor, which is opened when the 2nd capacitor C2 has a parallel positional relationship with the serially connected electromechanical transducer and 1st capacitor.

2. The driving device of claim 1, wherein the other end of the electromechanical transducer in expanding or contracting direction is fixed.

3. The driving device of claim 1, wherein a barrel which holds a lens is connected to the moving unit.

4. A method for driving a moving unit which is provided in a driving device:
   the driving device comprising:
   an electromechanical transducer, which expands or contracts under voltage;
   a rod, one end of which is fixed to one end of the electromechanical transducer, in expanding or contracting direction; and
   the moving unit, which is frictionally coupled to the rod, and which is driven along the rod when the rod vibrates with expanding and contracting of the electromechanical transducer;
   wherein a plurality of voltage values, which are stepwise and sequentially increased, are cyclically applied to the electromechanical transducer, such that sawtooth-like vibration generated thereby on the rod drives the moving unit in one direction along the rod, and a plurality of voltage values, which are stepwise and sequentially decreased, are cyclically applied to the electromechanical transducer, such that sawtooth-like vibration generated thereby on the rod drives the moving unit in opposite direction along the rod;
   the method comprising:
   a step of generating the plurality of voltage values which are stepwise and sequentially increased and the plurality of voltage values which are stepwise and sequentially decreased, by controlling of turning "on" or "off" of a plurality of switching elements, which are disposed in a circuit arrangement, wherein the electromechanical transducer, and 1st and 2nd capacitors are disposed between a positive power supply and a negative power supply;
   a step of controlling of the turning "on" or "off" of the switching elements, such that: when the moving unit is driven in the one direction by one voltage value of the plurality of voltage values which are stepwise and sequentially increased, the 1st capacitor is to be a parallel positional relationship with the electromechanical transducer and the 2nd capacitor which are serially connected, relative to the current flow, and such that: when the moving unit is driven in the opposite direction by one voltage value of the plurality of voltage values which are stepwise and sequentially decreased, the 2nd capacitor is to be a parallel positional relationship with the electromechanical transducer and the 1st capacitor which are serially connected, relative to the current flow;
   a step of opening a switching element which is arranged in serial to the 1st capacitor, when the 1st capacitor has a parallel positional relationship with the serially connected electromechanical transducer and 2nd capacitor; and
   a step of opening a switching element which is arranged in serial to the 2nd capacitor, when the 2nd capacitor C2 has a parallel positional relationship with the serially connected electromechanical transducer and 1st capacitor.

5. The method of claim 4, wherein the plurality of voltage values which are stepwise and sequentially increased comprises 4 kinds of voltage values, and
the plurality of voltage values which are stepwise and sequentially decreased comprises 4 kinds of voltage values.

6. The method of claim 4, wherein the other end of the electromechanical transducer in expanding or contracting direction is fixed.

7. A lens driving unit comprising:
a barrel, which holds a lens;
an electromechanical transducer, which expands or contracts under voltage from a driving pulse generator;
a rod, one end of which is fixed to one end of the electromechanical transducer, in expanding or contracting direction; and
a moving unit, which is frictionally coupled to the rod, and which is driven along the rod when the rod vibrates with expanding and contracting of the electromechanical transducer, the barrel being connected to the moving unit;
wherein the driving pulse generator cyclically applies 4 voltage values, which are stepwise and sequentially increased, to the electromechanical transducer, such that sawtooth-like vibration generated thereby on the rod drives the moving unit in one direction along the rod, and cyclically applies 4 voltage values, which are stepwise and sequentially decreased, to the electromechanical transducer, such that sawtooth-like vibration generated thereby on the rod drives the moving unit in opposite direction along the rod;
the 4 voltage values which are stepwise and sequentially increased and the 4 voltage values which are stepwise and sequentially decreased are generated by controlling of turning "on" or "off" of a plurality of switching elements, which are disposed in a circuit arrangement, wherein the electromechanical transducer, and 1st and 2nd capacitors are disposed between a positive power supply and a negative power supply;
the turning "on" or "off" of the switching elements are controlled, such that: when the moving unit is driven in the one direction by one voltage value of the 4 voltage values which are stepwise and sequentially increased, the 1st capacitor is to be a parallel positional relationship with the electromechanical transducer and the 2nd capacitor which are serially connected, relative to the current flow, and such that: when the moving unit is driven in the opposite direction by one voltage value of the 4 voltage values which are stepwise and sequentially decreased, the 2nd capacitor is to be a parallel positional relationship with the electromechanical transducer and the 1st capacitor which are serially connected, relative to the current flow;
another switching element is arranged in serial to the 1st capacitor, which is opened when the 1st capacitor has a parallel positional relationship with the serially connected electromechanical transducer and 2nd capacitor; and
still another switching element is arranged in serial to the 2nd capacitor, which is opened when the 2nd capacitor C2 has a parallel positional relationship with the serially connected electromechanical transducer and 1st capacitor.

* * * * *